Feb. 18, 1936.  V. D. BARKER  2,030,956
MEASURING APPARATUS
Filed Sept. 25, 1929

33, VOLTAGE DROP ACROSS 22-39
34, TUBE VOLTAGE AT .002 mm of Hg.
35, "     "      "  .005  "  "  "  "
36, "     "      "  .01   "  "  "  "
37, "     "      "  .05   "  "  "  "
38, "     "      "  ATMOSPHERE

Inventor
Virgil D. Barker
By N. H. Patterson Att'y.

Patented Feb. 18, 1936

2,030,956

UNITED STATES PATENT OFFICE 2,030,956

MEASURING APPARATUS

Virgil D. Barker, Riverside, Ill., assignor to Western Electric Company, Incorporated, New York, N. Y., a corporation of New York Application September 25, 1929, Serial No. 395,053

11 Claims. (Cl. 73—31)

This invention relates to measuring apparatus, and more particularly to apparatus for indicating the degree of vacuum in incandescent lamps.

An object of this invention is to provide a highly sensitive, accurate, and simple apparatus for measuring pressure.

Another object of the invention is to provide a gauge for indicating the degree of vacuum, which is not responsive to normal variance in the voltage impressed thereon incidental to the operation thereof.

In accordance with one embodiment, the invention contemplates the use of a bridge circuit somewhat similar to the Wheatstone bridge having suitable resistances in two of the opposite arms thereof, having a third arm consisting of a fine platinum wire sealed in a tube which is in open connection with a system for exhausting lamps, and having the fourth arm thereof unbalanced so that the change of voltage across the platinum wire due to the linear change in impressed voltage plus the secondary thermal effect is equal to the change in voltage across the standard unbalanced resistance arm to compensate for the effect on the bridge galvanometer caused by a variation in applied bridge voltage. The galvanometer is connected across the bridge for indicating the change in characteristics of the platinum wire sealed in the exhaust system in response to variations in pressure of the system thereby to indicate the degree of vacuum in the system. The voltage unbalance is equalized by a potential equal and opposite to the potential difference between the two arms in order to permit the use of a sensitive galvanometer to measure the change in characteristics of the platinum wire sealed in the exhaust system.

Figure 1:
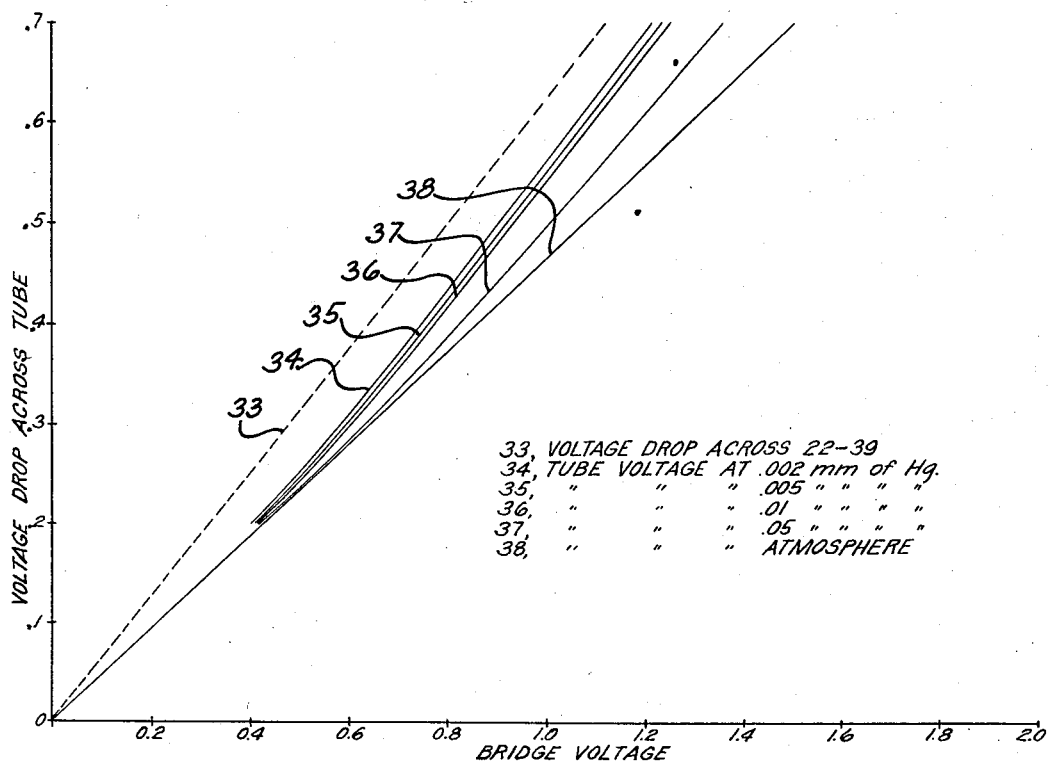
Figure 2:
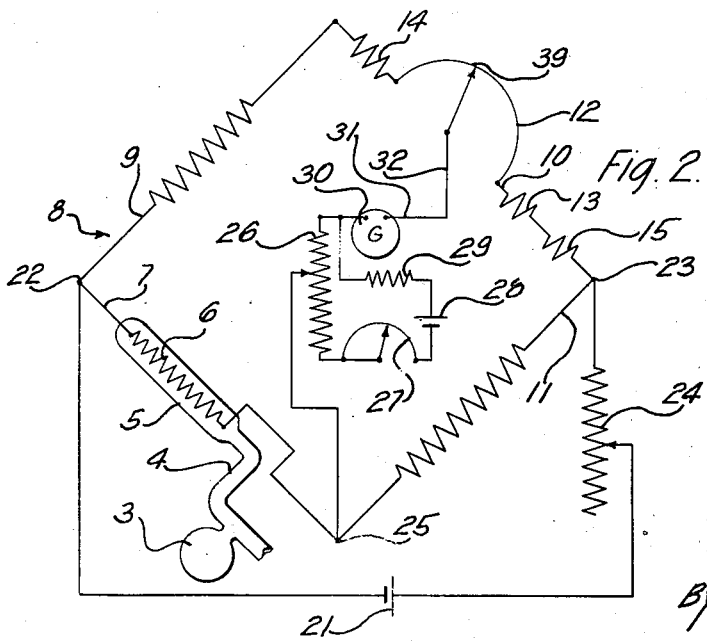

Other objects and advantages of the invention will more fully appear from the following detailed description taken in connection with the accompanying drawing, wherein Fig. 1 is a graphic representation of the comparative variance of voltage drop across the tube and that impressed on the bridge over a predetermined range of vacuum in the tube, and Fig. 2 is a schematic circuit diagram showing one embodiment of this invention.

Referring now to the drawing wherein like characters designate the same parts, particular reference being had to Fig. 2, the numeral 3 designates a lamp in the process of manufacture, which is connected through a connecting tube 4 with an exhausting system. The tube 4 has in open connection therewith a tube 5, in which is positioned a resistance element 6, composed of a platinum wire having a positive temperature coefficient of resistance, which element is connected in an arm 7 of a bridge circuit designated generally by the numeral 8.

Of the other arms of the bridge which are designated by the numerals 9, 10, and 11, the arm 9 has a 10 ohm resistance connected therein a 2 ohm resistance 14 and the portion of a variable 1 ohm resistance 12 to the left of point 39 and the arm 11 includes a 10 ohm resistance, while the arm 10 is made up of that portion of variable resistance 12 to the right of point 39, a 1 ohm resistance, and a 6 ohm resistance designated by the numerals 13 and 15, respectively. The particular values of resistance described herein are given as a specific example, and it is to be understood that the resistances may be of any value so long as the ratio is maintained proportional to that given in this specific example.

A source of electromotive force is supplied across the bridge from a two volt battery 21 having its positive and negative terminals connected to the bridge circuit at points 22 and 23, respectively. While specific voltages are mentioned herein it is to be understood that voltage value is chosen to maintain the platinum wire resistance element 6 below incandescent temperature in order to prevent undue radiation of heat. In the lead from the negative pole of the battery 21 to the point 23 on the bridge, a variable resistance 24 is inserted for varying the amount of electromotive force supplied from the battery 21 to the bridge circuit to control the temperature of the platinum wire and its sensitivity.

The junction of the arms 7 and 11 of the bridge circuit at 25 has a lead running therefrom to a 200 millivolt potentiometer 26, one of the leads from which has interposed therein a variable resistance 27 and is connected to the positive pole of 1.5 volt dry cell 28. The other lead from the potentiometer is connected through a 75 ohm resistance 29 to the negative pole of the 1.5 volt dry cell 28. The lead from the potentiometer 26 which runs to the dry cell 28 through the resistance 29 is connected normally to one side of an indicating galvanometer 30, the other side of which is connected through lead 31 and a lead 32 to the arm 10 of the bridge. After these connections are made the current flowing through the resistance 29 is regulated by varying the variable resistance 27 until the voltage across the resistance 29 is equal to the voltage from a standard cell as indicated by the deflection of a galvanometer.

It will be noted that the heretofore described bridge circuit differs from the ordinary Wheatstone bridge circuit in that an unbalanced condition is established in the arm 10 of the bridge. This arrangement permits the measurement of the characteristic of the platinum wire which is mounted in the tube 5 without the occurrence of an appreciable error in the galvanometer readings due to variance in the impressed voltage across the bridge 8. By properly choosing the unbalance in the arm 10, which may be accomplished by transposing the resistances 13 and 14 if a large variation is desired, or by varying the variable resistance 12 in the usual manner, the unbalance in conjunction with resistance 6 may be utilized to compensate for the effect of variations in the impressed voltage across the bridge from the battery 21 without causing a deflection of the indicating arm of the galvanometer. However, any change in pressure in the vacuum system and in the tube 5 will result in a change in characteristic of the arm 7 of the bridge resulting in a change in potential across the galvanometer.

It will be seen that by using the circuit described the normal increase in voltage across the arm 9 is equal to the increase in voltage across the platinum wire caused by the increased current flowing through the wire which raises the temperature and resistance of the wire. It has been found that with a bridge voltage of approximately .9 to 1.1 volts, the IR drop across the arm, including resistance 14, and that portion of resistance 12 to the left of point 39 in Fig. 2, is equal to the IR drop across the resistance 6. To illustrate by a practical example how the apparatus operates, let it be assumed that a potential of two volts is impressed upon the points 22 and 23 of the bridge. Let it be further assumed that the resistances in arms 7 and 11 are equal, the resistance in arm 9 to the left of point 39 is 11 ohms, and the resistance in arm 10 to the right of point 39 is 9 ohms. The point 25 will be at a potential of 1 volt and the point 39 will be at a potential of 1.1 volts. In other words, there will be a difference in potential of .1 volt between these points. If now the voltage applied to points 22 and 23 were doubled or raised to 4 volts, point 25 would be at a potential of 2 volts and point 39 would be at a potential of 2.2 or a difference in potential of .2 would exist between point 39 and point 25, which is twice the difference in potential that existed with 2 volts applied to points 22 and 23. This tendency of the potential to rise between points 39 and 25, due to an increase in voltage applied to points 22 and 23, is taken advantage of to compensate for the effect on the galvanometer reading due to the increase in current flowing through resistance 6 as a result of the increased voltage. As has been stated above, the resistance element 6 has a positive temperature coefficient of resistance, so that with an increase in voltage and, consequently, an increase in current through this resistance, the resistance increases in temperature and in resistance, thus producing a higher IR drop through the resistance 6 upon an increase in voltage, which is exactly offset by the rise in potential of point 39 when the voltage is increased. It is evident, therefore, that within the limits within which the resistance of resistance element 6 increases proportionately to an increase in current, the effect on the galvanometer reading due to the variation of the voltage of source 21 will be compensated for.

Referring to Fig. 1 and assuming that the voltage across the arm 9 to the left of point 39 increases, as shown by line 33, since the resistances of arms 9 and 11 have a zero temperature coefficient of resistance, it was found that a line 34 indicating the increase in tube voltage at .002 millimeter of mercury, a line 35 indicating the increase in tube voltage at .005 millimeter of mercury, or a line 36 indicating the increase in tube voltage at .01 millimeter of mercury, run parallel between certain limits, to the line 33 indicating the increase in voltage across the arm 9 which includes the resistance 14 and a portion of the resistance 12. The difference in potential between these points, it will be seen, remains constant regardless of changes in the voltage impressed on the bridge. However, the slightest change in pressure in the tube 5 will change the characteristic of the resistance 6 and cause deflection of the galvanometer indicator which is calibrated to indicate the pressure in the tube 5.

It will be noted that increased pressure in the tube as indicated by the lines 37 and 38 representing the tube voltage at .05 millimeter of mercury and at atmospheric pressure do not parallel the increase across the arm 9 and the portion of the arm 10 which includes the resistances 12 and 14 at the voltages shown. However, an increase in the bridge voltage would, if carried far enough, between certain points be proportional to the increase in voltage drop across the tube. Therefore, by supplying a potential equal and opposite to that set up by the unbalance of the bridge, from the dry cell 28 through the potentiometer 26, there will be no deflection of the galvanometer indicator if the pressure in the tube 5 remains constant.

While this invention has been described as applying to a means for measuring the degree of vacuum it will be understood that any type of gauge wherein the voltage across the bridge affects directly a resistance comprising one of the arms of the bridge may be made more accurate by utilizing this circuit.

What is claimed is:

1. A Wheatstone bridge having a source of current in one diagonal and an indicating device in the other diagonal, said bridge being unbalanced throughout its operative range, whereby changes in the voltage of said source produce a variable voltage across the indicator diagonal, one arm of said bridge having a coefficient of temperature resistance so related to the resistance characteristics of the other arms that, responsive to a change in voltage of said source, it will automatically introduce an opposite change in the voltage across the indicator diagonal.

2. In a measuring apparatus, a bridge circuit having a plurality of resistance arms, the resistance in one of said arms having a different coefficient of thermal resistance variation than the resistances in the other arms, a source of electromotive force connected to the bridge, means for varying the resistance in one of said resistance arms, the resistances of the arms of the bridge being selected to effect a normal proportional unbalance related to the resistance characteristic of said resistance having the different coefficient of thermal resistance variation to compensate for the effect of variations in voltage of said source.

2. In an apparatus for measuring pressure in a vessel, a bridge circuit having a plurality of resistance arms, a tube in communication with said vessel enclosing the resistance in one of said arms, the enclosed resistance having a different coefficient of thermal resistance variation than the resistances in the other arms, a source of electrical energy connected to the bridge, the resistances of the arms of the bridge being selected to effect a normal proportional unbalance related to the resistance temperature characteristic of the enclosed resistance so as to compensate for the effect of variations in voltage impressed on the bridge.

4. In an apparatus for measuring pressure, a Wheatstone bridge network having a resistance in one arm thereof having a high coefficient of thermal resistance variation, means for subjecting said resistance to pressure variations, a source of energy connected to said network, the resistances of the arms of the bridge being selected to effect a normal proportional unbalance related to the thermal resistance characteristic of said resistance so as to compensate for the effect of voltage variations of said source.

5. In an apparatus for measuring pressure, a vessel, a tube in open connection with the vessel, a resistance element having a high coefficient of thermal resistance variation positioned in said tube and resistively responsive to changes in pressure, an unbalanced bridge network having said resistance element connected in one of its arms, and a source of electromotive force connected across said bridge network, said unbalanced condition of the bridge being selected to effect a normal proportional unbalance relative to the coefficient of thermal resistance of the resistance element in said tube to compensate for the effect of normal variations in the electromotive force supplied by said source.

6. In an apparatus for measuring pressure, an evacuated vessel, a bridge circuit having a plurality of resistance arms, one of said arms being enclosed and in communication with said vessel the degree of evacuation of which is being measured, and having a different coefficient of thermal resistance variation than the resistances in the other arms, a source of electromotive force connected to said bridge, means for unbalancing the bridge in predetermined relation to the thermal resistance characteristic of said enclosed resistance, a galvanometer for registering the change in resistance due to pressure variations on the enclosed resistance, and means for impressing a counter voltage on said galvanometer to neutralize the effect of said unbalance on the galvanometer to cause the galvanometer to read zero whereby the galvanometer will respond only to changes of pressure in said vessel.

7. Apparatus of the kind described, comprising A Wheatstone bridge, one arm thereof having a different temperature coefficient of resistance from the other arms, the resistances of the arms of the bridge being selected to effect a normal proportional unbalance relative to the thermal characteristics of the first named arm, said first named arm being adapted to be subjected to a fluid to be measured, a potentiometer in circuit with the bridge galvanometer for varying and equalizing the normal potential difference between each side of the bridge to render the galvanometer reading nil, whereby the effect of any variation in the impressed bridge voltage is neutralized and changes in the resistance of the first arm due to variation in the fluid measured may be directly read on the galvanometer.

8. Apparatus of the kind described, comprising a Wheatstone bridge having input and output points, one arm thereof having a higher resistance variation with temperature than the other arms, the resistances of the arms of the bridge being selected to effect a normal proportional unbalance related to the thermal characteristics of the first named arm so as to compensate for the effects of voltage changes at the input points on the voltage of the output points, said first named arm being subjected to temperature changes, and a galvanometer operable in accordance with said temperature changes.

9. Apparatus of the kind described, comprising a Wheatstone bridge, one arm thereof having a higher resistance variation with temperature than the other arms, the resistances of the arms of the bridge being selected to effect a normal proportional unbalance related to the thermal characteristics of the first named arm, an indicating device connected to said bridge circuit, means for biasing said indicating device to indicate zero with said unbalance, and a source of electrical potential for said bridge circuit, said unbalance and resistance temperature characteristics being so related as to compensate for the effect of potential variations of said source.

10. An apparatus for measuring a vacuum, comprising a Wheatstone bridge having input and output points, one arm thereof having a different temperature coefficient of resistance from the other arms, a tube, said arm being enclosed in said tube and thermally responsive to the degree of vacuum in said tube, the resistances of the arms being selected to effect a normal proportional unbalance related to the thermal characteristics of the first named arm so as to compensate for the effects of voltage changes at the input points on the voltage of the output points, a source of electrical potential connected to said input points, a galvanometer for indicating the unbalance of the circuit due to change in vacuum in said tube, and an auxiliary source of potential applied to the galvanometer to compensate for the unbalance of the bridge, said galvanometer being independent of current variations through the bridge caused by variations in the potential of said source connected to the input points.

11. In a measuring apparatus, a bridge circuit having input and output points, a vacuum responsive element including a resistance in one arm thereof, the resistances of the other arms of the bridge being selected so that one arm will have such a resistance value relative to the other arms as to effect a normal proportional unbalance related to the temperature resistance characteristics of the resistance element of said vacuum responsive element so as to compensate for the effects of voltage changes at the input points on the voltage of the output points, a source of electromotive force connected to the bridge circuit, galvanometer connected across the bridge circuit, and an auxiliary source of potential connected to the galvanometer to correct the reading for the unbalance of the bridge circuit.

VIRGIL D. BARKER.